O. A. MULLER.
CARBON SCRAPER FOR PISTON RING GROOVES.
APPLICATION FILED AUG. 25, 1919.
1,345,215.
Patented June 29, 1920.
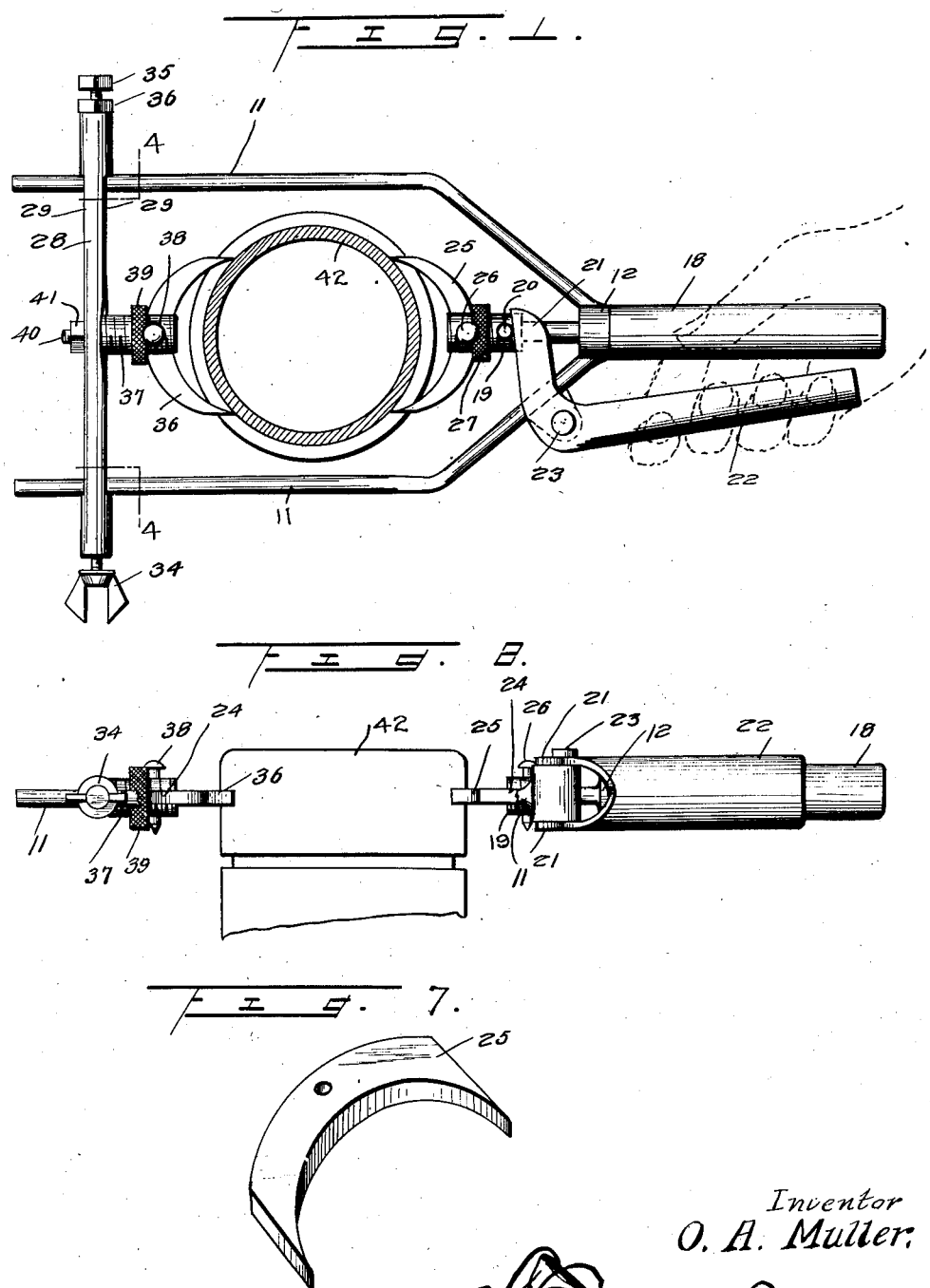

O. A. MULLER.
CARBON SCRAPER FOR PISTON RING GROOVES.
APPLICATION FILED AUG. 25, 1919.
1,345,215.
Patented June 29, 1920.
2 SHEETS—SHEET 2.
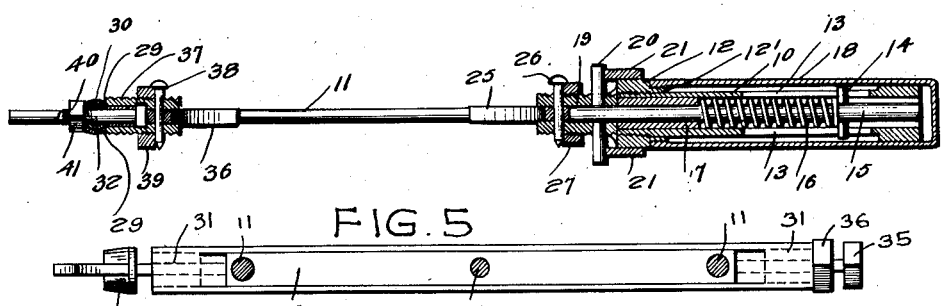
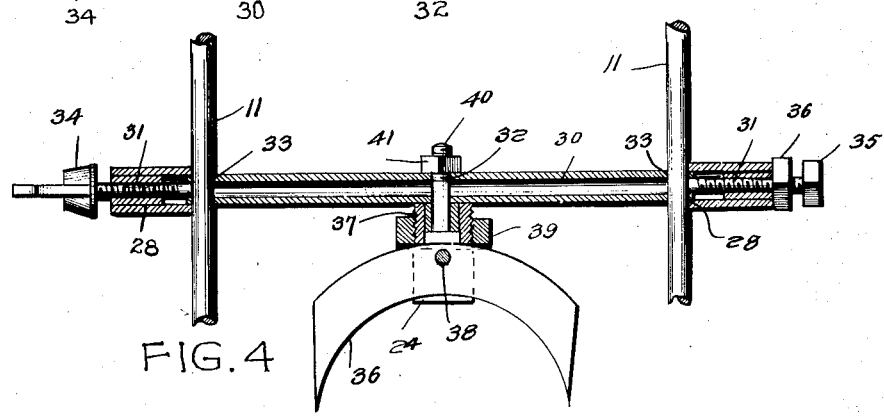
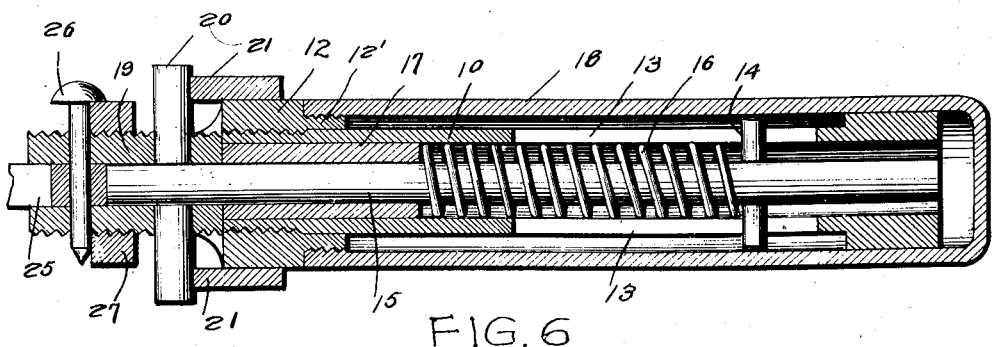
Inventor
O. A. Muller
By (signature)
Attorney

UNITED STATES PATENT OFFICE.

OTTO A. MULLER, OF DUNCAN, OKLAHOMA.

CARBON-SCRAPER FOR PISTON-RING GROOVES.

1,345,215.

Specification of Letters Patent. Patented June 29, 1920.

Application filed August 25, 1919. Serial No. 319,595.

*To all whom it may concern:*

Be it known that I, OTTO A. MULLER, a citizen of the United States, residing at Duncan, in the county of Stephens and State of Oklahoma, have invented certain new and useful Improvements in Carbon-Scrapers for Piston-Ring Grooves; and I do hereby declare the following to be a full, clear, and exact description of the invention, such as will enable others skilled in the art to which it appertains to make and use the same.

This invention relates to an improved carbon scraper for use in removing carbon from piston ring grooves and one object of the invention is to provide a scraper so constructed that it may be set to the approximate size of the piston and then moved to bring the scrapers into register with the grooves, means being provided for bringing the scrapers into proper position in the grooves and for holding them in proper engagement with the inner walls of the grooves while scraping the carbon from the grooves.

Another object of the invention is to so construct this carbon remover that it may be operated with one hand after being set to the approximate size and to further so construct the remover that it may be moved out of one groove and into another without it being necessary to make adjustments.

Another object of the invention is to so construct the remover that there will be no danger of it slipping out of the approximate adjustment after being once set.

Another object of the invention is to so construct this carbon remover that the sliding plunger mounted in the handle thereof and carrying one of the scraping blades may be yieldably retained in a retracted position, actuating means being provided for moving this plunger outwardly for operative adjustment after the approximate adjustment has been made.

Another object of the invention is to so construct the scraper that the scraping blades thereof may be firmly held in contact with the carbon to be removed thus permitting the carbon to be easily and quickly cut out of the grooves without danger of the piston being scarred and without danger of the hands of the operator being cut or otherwise injured.

Another object of the invention is to so construct this carbon remover that the scraping blades may be releasably held in place and prevented from having any pivotal movement when the scraper is in use.

Another object of the invention is to so construct the scraper that it will be comparatively simple in construction, easy to operate and not liable to readily get out of order or break.

This invention is illustrated in the accompanying drawings, wherein:

Figure 1 is a view showing the improved carbon remover in top plan and shown in operative relation to a piston shown in section.

Fig. 2 is a view showing the carbon remover and the piston in side elevation, one of the side arms of the remover being broken away.

Fig. 3 is a longitudinal sectional view through the carbon remover.

Fig. 4 is a transverse section taken along the line 4—4 of Fig. 1.

Fig. 5 is a view showing the adjustably mounted cross bar in longitudinal section.

Fig. 6 is an enlarged sectional view through the handle of the scraper.

Fig. 7 is a perspective view of one of the scraping blades.

This carbon remover is provided with a hollow handle 10 with which the side arms 11 are connected by a sleeve or collar 12, the handle being provided with longitudinally extending slots 13 to receive the end portions of the pins 14 which extend through the plunger 15 slidably mounted in the handle and yieldably retained in a retracted position by means of the spring 16 positioned in the handle about the plunger and between the pin 14 and bushing 17. A casing or outer handle section 18 is positioned about the handle and may be releasably secured in any suitable manner, in the present instance the outer casing being screwed upon the reduced and threaded end portion 12' of the collar 12. An externally threaded sleeve or head 19 is provided at the outer end of the plunger 15 and is secured thereon by the cross pin 20 which extends through the head and plunger and is engaged by the arm 21 of the actuating lever 22 which is pivotally mounted through the medium of the bearing 23 carried by one of the side arms 11. This actuating lever extends in operative relation to the handle and when gripped and moved toward the handle will cause the plunger to be moved outwardly against the action of the spring. When the lever is released, the spring will move the plunger inwardly until the head 19 comes into contact with the handle and bushing 17. The threaded head 19 is provided with a longitudinally extending slot 24 in which will be positioned the scraping blade 25, the scraping blade being held in place by a set screw or pin 26. The scraping blade would have a tendency to move pivotally upon this pin when the device is in use and in order to overcome this there has been provided a clamping ring 27 which is screwed upon the threaded head 19 and will engage the scraping blade as shown clearly in Fig. 1, thus securely clamping the blade in place and preventing pivotal movement. It will thus be seen that the blade will at all times be held in the proper position for cutting the carbon out of the piston ring grooves of the piston.

A cross bar 28 which is hollow and provided with side slots 29 extends transversely of the side arms 11 as shown in Fig. 1 and carries a hollow rod 30 which is loosely mounted in the cross bar for sliding movement longitudinally therein between the internally threaded bushings 31 mounted in the end portion of the cross bar. This hollow rod 30 is provided with openings 32 and 33, the openings 33 being positioned adjacent the ends of the core and receiving the side arms 11 so that the cross bar will be slidably mounted upon the side arms. Set screws 34 and 35 are threaded through the bushings 31 and a clamping nut 36 is carried by the set screw 35 so that this set screw may be locked in a desired position. After the cross bar has been moved to a desired position upon the side arms, the set screw 34 may be turned inwardly and its inner end will engage its coöperating side arm 11 and will move this side arm and the hollow rod 30 toward the second side arm until the second side arm is brought into engagement with the inner end of the set screw 35. Further turning of the set screw 34 will securely clamp the cross bar to the side arms.

The second scraping blade 36, which will be referred to as the relatively stationary scraping blade, is positioned in a slot formed in the externally threaded head 37 and secured in place by a pin 38 similar to the pin 26, a locking nut 39 similar to the nut 27 is provided upon this head for securing the blade 36 against pivotal movement. A stem 40 is carried by this head 37 and extends through the opening 32 of the bar 28, a securing nut 41 being provided to secure the stem in place. It will thus be seen that the scraping blade 36 as well as the scraping blade 25 may be easily removed when it is desired to substitute a new set for those already in place and that these blades may be very securely held in place when in use and prevented from having any pivotal movement.

When this scraper is in use, a set of scraping blades which are of proper size for use in connection with the piston 42 will be put in place and secured as shown. The scraper will be placed over the piston with the actuating lever extending from the handle and the plunger in a retracted position. The cross bar will then be moved to the position shown in Fig. 2 so that the scraping blades are brought into light engagement with the piston. The set screw 34 will now be turned to clamp the cross bar to the side arms and the scraper will be thus given the approximate adjustment and will be ready for use. The scraper can now be held with one hand by grasping the handle and lever and after being moved downwardly to bring the scraping blades into register with the first groove to be cleaned, the lever will be drawn toward the handle and the plunger will be moved outwardly thus moving the relatively movable scraping blade toward the relatively stationary scraping blade. The scraping blades will then be positioned in the groove as shown in Fig. 1. The scraper will now be turned back and forth and by applying proper pressure to the lever 22 the carbon in the groove can be easily and quickly cut out. Since the scraping blades engage the inner wall of the piston grooves at four points it will be readily seen that it will not be necessary to make a complete revolution in order to remove the carbon from all points of the grooves. It will be further noted that since the blades engage the piston at the angle shown in Fig. 1, these blades will be positioned at the proper angle for the most effective cutting of the carbon. After the first groove has been thoroughly cleaned, it is simply necessary to release the lever 22 and the spring 16 will return the plunger to the retracted position thus moving the movable blade away from the stationary blade and permitting the scraper to be moved along the piston to the second ring which will then be cleaned in the same manner as the first. After all of the rings of one piston have been cleaned, it is simply necessary to remove the scraper from the piston and then transfer it to a second piston to be cleaned. If the second piston is of the same size as the first it will not be necessary to make any adjustment of the cross bar 28, but if the second piston is of a different size adjustment must be made and a set of blades of suitable size substituted for those already in use. It will thus be seen that there has been provided a very efficient carbon remover so constructed that it may be easily and quickly put in place and further so constructed that the carbon may be removed with a minimum amount of labor and without any danger of the piston becoming scarred or the hands of the operator being injured.

What is claimed is:

1. A device for the purpose set forth consisting of an open supporting frame, oppositely arranged holders adjustable in said frame and within said opening, tools carried by said holders and having edges adapted to scrape the walls of the grooves of a piston held within said openings substantially as described.

2. A device for the purpose set forth consisting of an open frame, oppositely arranged holders adjustable in said frame and within said opening, scraping tools carried by said holders, and a handle; the adjustment of one of said holders being yielding relative to said handle, and means connected with said frame for adjusting said yielding holder.

3. A carbon scraper for a piston ring groove comprising a pair of arcuate scrapers, a frame for supporting said scrapers on opposite sides of said piston, said scrapers being adapted for engagement with the walls of the piston ring groove to scrape the carbon therefrom during oscillation of the frame around said piston, one of said scrapers being adjustable toward the remaining scraper to bring both of the scrapers into the piston groove, and an operating handle for said frame.

4. A carbon scraper for a piston ring groove comprising a supporting frame for engagement around the piston, a cross bar mounted on said frame and adjustable thereon, a scraper carried by said cross bar, a handle for said frame, a supporting member adjustable through said handle, a second scraper mounted on said supporting member and movable toward the first mentioned scraper whereby both scrapers may be brought into engagement with the walls of a ring groove of the piston, and means for retaining said scrapers in engagement with the walls of the ring groove during operation of the frame around the piston to remove the carbon from said groove.

5. A cleaner for the ring groove of a piston including a frame structure for rotatably engaging the piston, said frame structure having a handle, a plunger slidably carried by said handle, a scraping element connected with said plunger for fitting into said ring groove of the piston, and means for moving the plunger to move the scraping element into and out of the ring groove.

6. A carbon remover comprising a handle, arms extending from the handle, a cross bar carried by the arms, a plunger slidably mounted in the handle, resilient means yieldably retaining the plunger in a retracted position, an actuating lever pivotally mounted and having cross extensions for engaging the plunger to move the same outwardly against the action of the resilient means, a scraping element connected with the outer end portion of the plunger, and a scraping element connected with the cross bar.

7. A carbon remover including a frame structure having a handle, a plunger slidably mounted in the handle, resilient means yieldably retaining the plunger in a retracted position, a head at the outer end of the plunger externally threaded and having its outer end portion provided with a longitudinally extending slot, a scraping element positioned in the slot of the plunger head, a pin passing through the plunger head and scraping element to retain the scraping element in place, a clamping nut screwed upon the plunger head for engaging the scraping element to hold the scraping element against pivotal movement, and means for moving the plunger outwardly against the action of the resilient means.

8. A carbon remover including a frame structure, a scraper holding element externally threaded and provided with a longitudinally extending cutout forming a seat, a scraping element positioned in the seat, a securing pin passing through the carrier and scraping element to hold the scraping element in place, and a clamping element screwed upon the carrier for engaging the scraping element to retain the same against pivotal movement.

9. A carbon remover comprising a frame structure including a handle, a plunger slidably mounted in the handle and yieldably held in a retracted position, a head fitting upon the outer end portion of the plunger, a pin extending through the head and plunger, an actuating lever pivotally mounted and having extensions engaging the pin for moving the plunger outwardly, and a scraper element connected with said head.

10. A carbon remover including a frame structure having side arms, a hollow cross bar having internally threaded end portions, a rod slidably mounted in the hollow cross bar and provided with openings receiving said arms, the end portions of the rod being hollow, set screws threaded through the end portions of the hollow cross bar and extending into the hollow end portions of the rod to engage said arms to clamp the cross bar in place upon the arms, and scraper holding means carried by the rod.

In testimony whereof I affix my signature in presence of a witness.

OTTO A MULLER.

Witness:
BENNETT S. JONES.